H. NELSON.
DRAFT DEVICE.
APPLICATION FILED JUNE 9, 1915.

1,223,093.

Patented Apr. 17, 1917.

Witnesses:
John Endere,
Mildred Stumpf.

Inventor:
Herman Nelson
by Fred Gerlach
his Atty.

UNITED STATES PATENT OFFICE.

HERMAN NELSON, OF CHICAGO, ILLINOIS, ASSIGNOR TO JOHN A. McGARRY & COMPANY, OF CHICAGO, ILLINOIS, A COPARTNERSHIP CONSISTING OF JOHN A. McGARRY AND HENRY FOWLER.

DRAFT DEVICE.

1,223,093.          Specification of Letters Patent.          Patented Apr. 17, 1917.

Application filed June 9, 1915. Serial No. 33,147.

*To all whom it may concern:*

Be it known that I, HERMAN NELSON, a resident of Chicago, in the county of Cook and State of Illinois, have invented certain new and useful Improvements in Draft Devices, of which the following is a full, clear, and exact description The invention relates to draft-devices for vehicles, such as tank-wagons In road building, it is now customary to draw a loaded tank-wagon by a tractor or steam roller, from place to place while the contents of the tank are being used or discharged, to deliver the material at the point most convenient for use, and it is also customary to haul the tank-wagons to the place where the road is being built, by team, the latter being also used to haul away the empty tank-wagon while a loaded one is left to be hitched to the tractor. In order to adapt the wagon for draft by either team or tractor, it has been the practice to remove the tongue from the wagon and provide some short connection or draft bar between the tractor and the wagon. It is desirable to save as much time as possible in coupling and changing the draft-device for connection to the tractor or to a team.

The present invention is designed to provide improved draft-appliances which permit the wagon to be quickly hitched to a tractor after it has been hauled to the place for use by the team, and to avoid the necessity of disconnecting the tongue from the wagon every time that it is to be drawn by the tractor and replacement of the tongue every time that it has been unloaded and is to be hauled away by a team.

The invention consists in the several novel features hereinafter set forth and more particularly defined by claims at the conclusion hereof.

Figure 1:
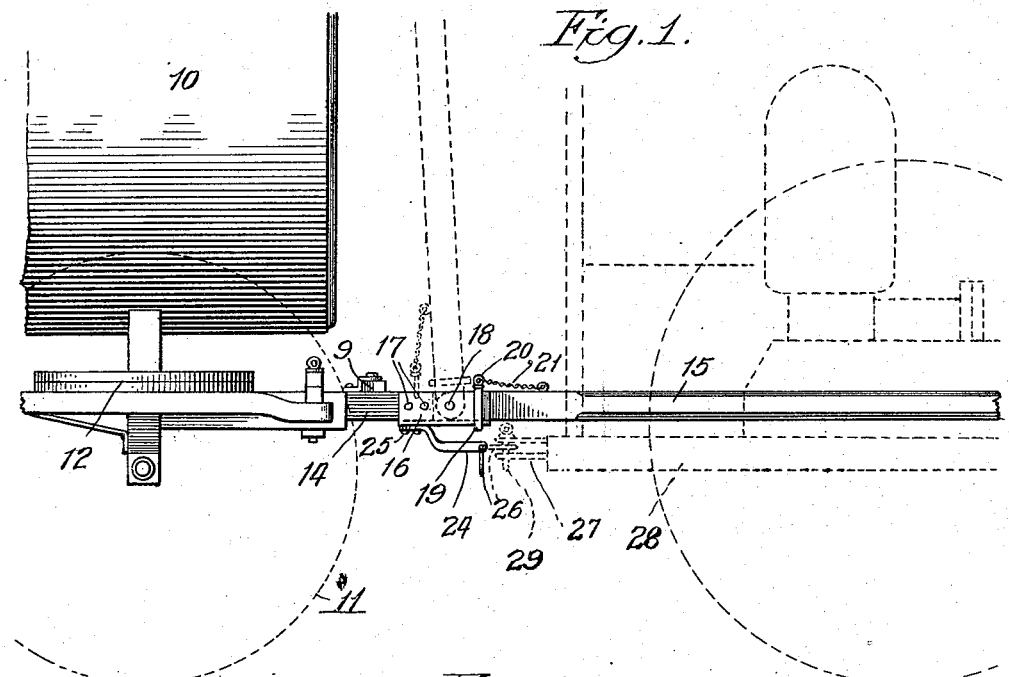
Figure 2:
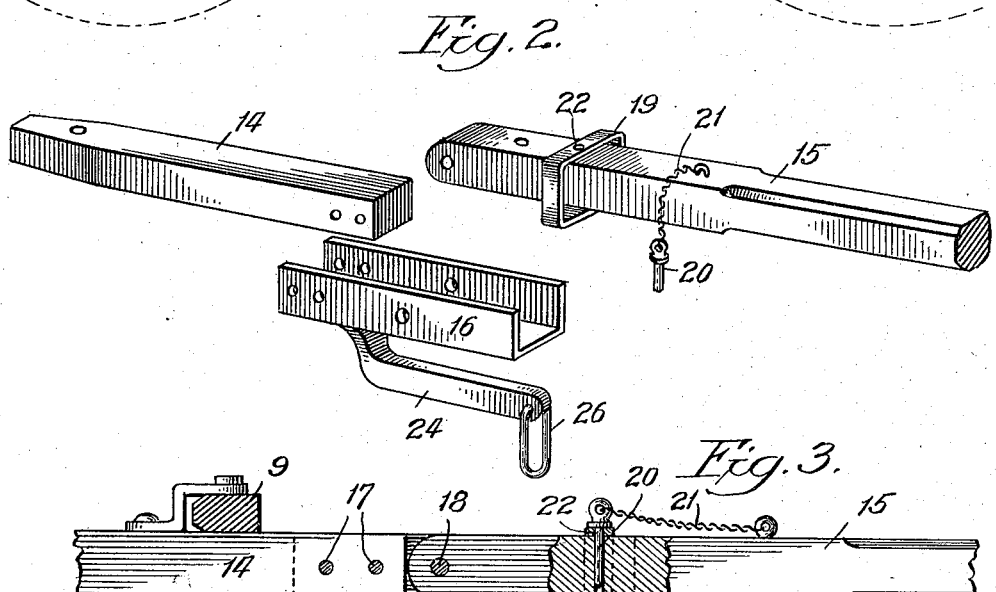
Figure 3:
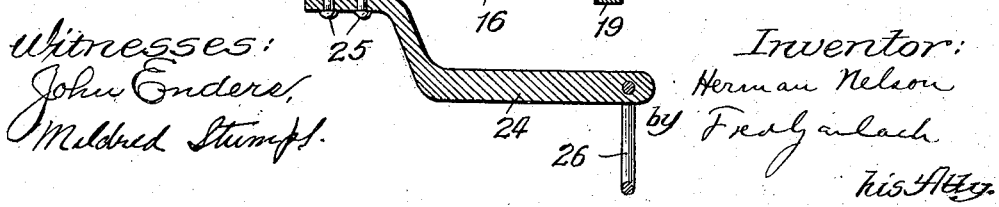

In the drawings: Figure 1 is a side elevation of a tank-wagon provided with the invention. Fig. 2 is a perspective of the tongue parts in separated relation. Fig. 3 is a section showing the tongue parts in position assumed when the wagon is to be hauled by a team.

The tank wagon may be of any suitable construction and usually comprises a tank 10, front wheels 11 and a fifth wheel 12 which is pivotally connected to the body of the wagon so that the front wheels can be turned to guide the wagon. A draft-tongue or pole comprises a member 14 which is rigidly secured to the axle of wheels 11 and to the hounds or the rotatable member of the fifth wheel in any suitable manner in which the tongue is usually secured thereto, as well understood in the art. Member 14 extends forwardly from the axle and being rigidly secured thereto, is adapted to turn said axle and front wheels to steer the vehicle. A double tree 9 is pivotally connected to the tongue-member 14. A tongue-member 15 is pivotally connected to the fixed member 14 so that it can be swung vertically as indicated by dotted lines in Fig. 1 when the wagon is to be or is being drawn by a tractor, and so that the wagon can be connected to the tractor by a short coupling whereby the tank-wagon will respond quickly to the lateral movement of the tractor. When the wagon is being drawn by team, a long pole or tongue is necessary and the latter usually controls the lateral movements of the front wheels of the wagon through the tongue. For this purpose, tongue-members 14 and 15 are rigidly secured together when the wagon is being drawn by a team. A channel-bar 16, in which the end adjacent the ends of the tongue-members fit, is rigidly secured to member 14 by bolts 17 and the tongue-member 15 is pivoted to said channel-bar by a bolt 18 which passes through the rear end of said member and through the side flanges of the channel bar. A ring 19 is adapted to be slipped around the tongue-member 15 and channel-bar 16 to lock said member to the channel-bar and to the tongue-member 14, so that the team will properly control the direction of travel of the tank-wagon. A lock-pin 20 connected to the member 15 by a suitable flexible connection, such as a chain 21, is adapted to be dropped into a hole 22 in top of ring 19 to lock the ring against longitudinal movement on the tongue when the ring is in operative position as shown in Fig. 3. From the foregoing, it will be obvious that when the tongue-members are locked together, the team will control the direction of the travel of the tank-wagon and a tongue of sufficient length will be provided to extend to the front of the horses for a neck-yoke connection.

When the team has hauled a wagon to the point where it is desirable to haul the wagon by a tractor, pin 20 will be withdrawn from tongue-member 15 and ring 19 will be slipped forwardly off the end of channel bar 16. Tongue-member 15 will then be free to be swung upwardly to a substantially vertical position adjacent the front of the tank-wagon and where it will permit the tractor to be coupled to the tank-wagon by a short and suitable connection.

A draw-bar 24 is secured to channel-bar 16 by rivets 25 and this draw-bar is disposed below the channel bar and the tongue, where it will not interfere with the team when the tongue-member 15 is being used in hauling the wagon. A coupling link 26 is pivotally connected to the front end of draw-bar 24 and this link is adapted to be connected to the usual draw-head 27 on tractor 28 by a suitable coupling pin 29. When the tank-wagon is thus coupled to a tractor, the latter will connect the tractor and wagon in such manner that the tractor will control the direction of travel of the wagon and will swing the tongue-member 14 and front wheels 11 of the tank-wagon laterally responsively to the travel of the tractor.

The invention thus exemplifies an improved draft-device which may be quickly adjusted to adapt the tank-wagon to be hauled by team or by tractor. In road building, it is desirable to effect this change of connection in the shortest possible space of time to save the time of the team, the tractor and the operators.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a draft-appliance for a vehicle, the combination of a tongue comprising a plurality of members, one of which has its rear end fixed to the vehicle and the other of which has its rear end pivotally connected to the front of the fixed member to permit the front member to be swung into a substantially upright position, and a draft bar whereby the fixed member may be coupled to a tractor while the pivoted member is in upright position.

2. In a draft-device for a vehicle, the combination of a tongue comprising a plurality of members, one of which has its rear end fixed to a vehicle, a connection between the members comprising a bar secured to the fixed member and to which the other member is pivoted so it may be swung into a substantially upright position and a draft-bar secured under the tongue whereby the fixed member may be coupled to a tractor while the pivoted member is in an upright position.

HERMAN NELSON.

Witnesses:
 MILDRED STUMPF,
 KATHARINE GERLACH.

Copies of this patent may be obtained for five cents each, by addressing the "Commissioner of Patents, Washington, D. C."